Patented May 9, 1950

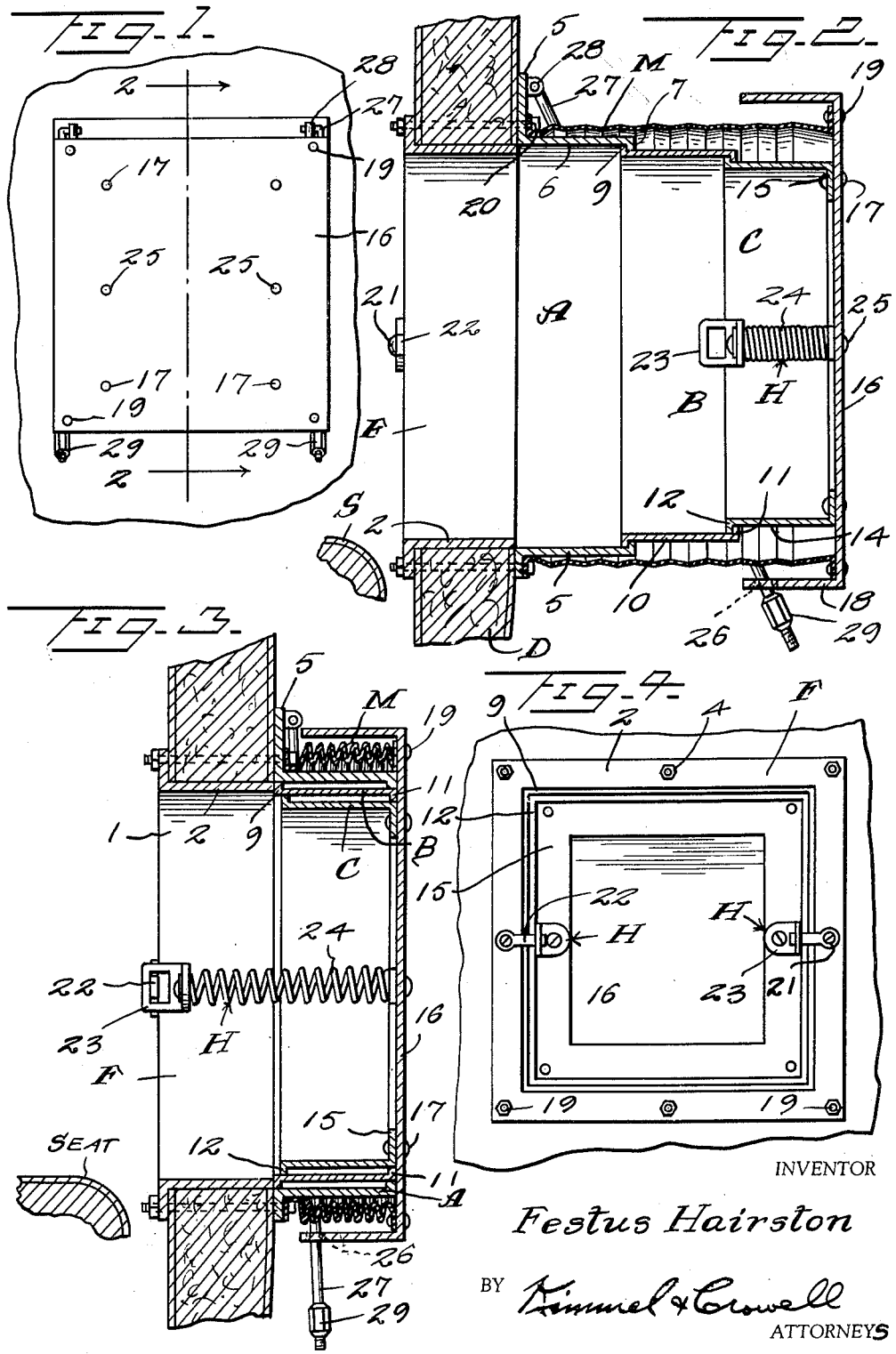

2,506,870

UNITED STATES PATENT OFFICE 2,506,870

SLEEPING ATTACHMENT FOR VEHICLES

Festus Hairston, Detroit, Mich.

Application December 11, 1945, Serial No. 634,357

4 Claims. (Cl. 296—23)

1

This invention relates to a sleeping attachment for vehicles and it is primarily an object of the invention to provide an attachment of this kind adapted to be carried by a wall of the vehicle and preferably a door, in such relation with respect to a seat within the vehicle to allow a person to assume a fully extended or lying posture.

Another object of the invention is to provide an attachment of this kind which is collapsible so as to occupy a minimum of space when not in use together with means for effectually supporting the attachment when in extended or working adjustment.

A still further object of the invention is to provide an attachment of this kind wherein a wall, preferably a door of the vehicle is provided therethrough with an opening which, and when the door is closed, has its lower margin substantially flush with the top of a seat within the vehicle, so that a person reclining on the seat may extend the lower limbs out through the opening to assure a maximum of comfort, together with means carried by the wall or door for enclosing the portions of the limbs extended outwardly through the opening to protect the person against the elements.

An additional object of the invention is to provide an attachment for use in connection with a wall or door of a vehicle, and particularly of a commercial type, to enable the driver or other person to rest while en route or at a point of destination.

The invention consists in the details of construction and in the combination and arrangement of the several parts of my improved sleeping attachment for vehicles whereby certain important advantages are attained, as will be hereinafter more fully set forth.

In order that my invention may be the better understood, I will now proceed to describe the same with reference to the accompanying drawings, wherein:

Figure 1 is a view in front elevation illustrating an attachment constructed in accordance with an embodiment of the invention, an associated portion of a vehicle being shown in fragment, and the attachment extended;

Figure 2 is a sectional view taken substantially on the line 2—2 of Figure 1;

Figure 3 is a sectional view taken on substantially the same line as Figure 2, but showing the attachment retracted or collapsed;

Figure 4 is a view in elevation of the inner end of the assembly illustrated in Figure 1.

In the embodiment of the invention as illustrated in the accompanying drawings, D denotes generally a door of a motor driven vehicle, preferably of a commercial type, and which is immediately adjacent to the end of a seat structure S, which may be as preferred except that the top surface of the structure S is substantially flush with the lower edge or margin of an opening 1,

2 disposed through the door D when the door is closed. As disclosed in the drawings, this opening 1 is rectangular in form and is of such dimensions as to allow the ready and easy insertion therethrough of the feet and adjacent leg portions of a person in an extended position of the seat structure S, as when lying down to rest.

Snugly fitting within the opening 1, and insertible therethrough from within, is a frame F, the side members 2, of which are of such length as to extend a desired distance beyond the outer face of the door D. The inner margins of the members 2, are defined by the outstanding flanges 3, which have close contact with the inner face of the door D and secured thereto by the suitably positioned bolts 4, or otherwise as may be preferred.

The bolts 4 also extend through and have holding engagement with the outstanding flanges 5, of the members 6, of an outside frame A, the extended portions of the frame F being snugly received with the inner portion of the frame A, to form a tight connection.

The outer margins of the members 6 are provided with the inwardly projecting and relatively short flanges 7, which are adapted to be engaged by the relatively short outstanding flanges 9, at the outer margins of the side members 10 of a floating frame B which is freely insertible within the frame A through the inner end thereof before being mounted on the door.

The outer margins of the frame B, are also provided with the inwardly disposed and relatively short flanges 11, which are adapted to be engaged by the outwardly directed and relatively short flanges 12, and the inner margins of the side members 14, of a second floating frame C, initially insertible into the frame B, through the inner end thereof. Additional frames such as B and C may be employed but it has been found in practice that by having the side members 10 and 14 of the frames B and C, respectively, of proper dimensions axially of the frames, the two are sufficient.

It is believed to be apparent that the frames B and C will readily retract or extend one with respect to the other and that both of the frames B and C, when retracted will readily meet within the frame A, whereby the structure, when not in use, may be collapsed or compacted to occupy a minimum of space.

The outermost frame C has its outer margins provided with the inwardly disposed flanges 15, which have close contact with a closing plate 16, and bolted, as at 17, or otherwise securely attached thereto. The plate 16, extends marginally beyond the sides of the member C, and has its marginal edges defined by the inwardly disposed flanges 18, of a length to closely approach if not contact the outer face of the door D, when the frames B and C are nested or compacted within the frame A. As shown in the accompanying drawings, the flanges 8, define an area to snugly receive the flanges 5 of the frame A, when the floating frames B and C are compacted or nested in the frame A.

Disposed around the frames A, B, and C, is a flexible protecting member M, of leather, canvas, or other desired material and herein shown as of a bellows type. One extremity of the member M is secured, as at 19, to the inner face of the plate 16 and surrounding the member C, while the opposite extremity of the member M is secured, as at 20, to the flanges 5 of the member A, in surrounding relation to said member A.

Rotatably secured, as at 21, to the central portions of opposed side members 2, of the frame F, are the short arms 22, which, when inwardly disposed, extend within the field of the frame F, to allow engagement therewith of the holding devices H, for maintaining the frames B and C compacted or nested one within the other and within the frame A. As shown in the accompanying drawings, each of these devices H, comprises a loop 23 or the like to engage over an extended extremity of an arm 22. This loop 23 is carried by a retractile spring 24, of proper length, and which is anchored, as at 25, to the plate 16, within the frame C and closely adjacent to a side member 14.

The lowermost flange 18, of the plate 16, at opposite sides of the frame C, is provided with the openings 26, through which freely pass the lower portions of the elongated rods 27. These rods 27, at their upper extremities, are hingedly connected, as at 28, with the top flange 5 of the frame A. The rods 27, below the plate 16, are provided with the heads or enlargements 29, herein disclosed as nuts threaded to proper position of the rods 27, and which are of a diameter larger than that of the openings 26. As the frames B and C are moved outwardly the rods 27 will also be swung outwardly until the lowermost flange 18 of the plate 16 contacts the heads or enlargements 29, which occurs when the frame C has been outwardly moved to its limit. It will therefore be readily noted that when the attachment is extended for use, the rods 27 will effectually support the outer or extended end portion of the attachment.

From the foregoing description, it is believed to be apparent that when the attachment is extended outwardly with respect to the door D, a person can readily assume a comfortable lying posture on the seat structure S, as the feet and adjacent portions of the legs can be readily inserted out through the opening 1, and within the floating frames B and C, and the parts associated therewith will protect the person against the elements and other annoyances.

It is also believed to be equally apparent that when the device is not in use, the frames B and C can be readily compacted or nested immediately adjacent to the door D, to occupy a minimum of space and to be otherwise out of the way.

From the foregoing description it is thought to be obvious that a sleeping attachment for vehicles constructed in accordance with my invention is particularly well adapted for use by reason of the convenience and facility with which it may be assembled and operated.

I claim:

1. The combination with a wall of a door of a motor vehicle body having an opening therethrough in the lower half thereof and a seat structure within the body adjacent to the opening, of an extensible and retractible enclosure unit carried by the wall of said door on the outer side thereof and with which the opening communicates to facilitate the extension into the unit of a member of a body lying on the seat, said enclosure comprising a number of slidably joined telescoping sections, the outer section comprising a boxlike structure having sides spaced from the adjacent telescopic section and enclosing a flexible protecting member surrounding the telescopic sections and secured to the end sections of the enclosure unit when the unit is retracted, and means for connecting together the wall of a door and a section of the enclosure, when said enclosure is extended, to support the outer part of the unit.

2. The combination with a wall of a door of a motor vehicle body having an opening therethrough and a seat structure within the body adjacent to the opening; of an extensible and retractible enclosure unit carried by the wall of the door exteriorly of the body and with which the opening communicates to facilitate extension into the unit of a member of a body lying on the seat, said enclosure comprising a number of telescopically joined sections, means coacting with the wall of a door and a section of the enclosure, when said enclosure is extended, to support the outer part of the unit, said means comprising rods hingedly connected with the wall of the door and having loose connection with the outer section of the enclosure unit, and means carried by the rods to engage the said outer section when the unit is extended for the support of the extended end of the enclosure unit.

3. An attachment for vehicles as set forth in claim 2 wherein said telescopically joined sections each comprise a frame having outwardly and inwardly extending flanges on respectively opposite edges.

4. The combination with a wall of a door of a motor vehicle body having an opening therethrough and a seat structure within the body adjacent to the opening; of an extensible and retractible enclosure unit carried by the wall of the door exteriorly of the body and with which the opening communicates, to facilitate extension into the unit of a member of a body lying on the seat, said enclosure unit being when extended in the form of a long housing and comprising a series of frame like members slidably coupled together to nest one within the other, means for securing one of said members to the wall of said door, and a flexible protecting member surrounding said members and interposed between and secured to the end members of the enclosure unit.

FESTUS HAIRSTON.

REFERENCES CITED

The following references are of record in the file of this patent:

UNITED STATES PATENTS

| Number | Name | Date |
|---|---|---|
| 1,287,925 | Eber | Dec. 17, 1918 |
| 1,542,526 | Robinson | June 16, 1925 |
| 2,122,681 | Dykes | July 5, 1938 |
| 2,134,487 | Levinson | Oct. 25, 1938 |
| 2,224,494 | White | Dec. 10, 1940 |
| 2,278,450 | Jones | Apr. 7, 1942 |

FOREIGN PATENTS

| Number | Country | Date |
|---|---|---|
| 424,791 | Great Britain | Feb. 28, 1935 |